US009875472B2

(12) United States Patent
Granbery et al.

(10) Patent No.: US 9,875,472 B2
(45) Date of Patent: Jan. 23, 2018

(54) DRIVE THROUGH MONITORING USING WIRELESS BEACONS

(71) Applicant: PAYPAL, INC., San Jose, CA (US)

(72) Inventors: John Hastings Granbery, San Jose, CA (US); Prakash Chandra, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 484 days.

(21) Appl. No.: 14/334,330

(22) Filed: Jul. 17, 2014

(65) Prior Publication Data
US 2016/0019526 A1 Jan. 21, 2016

(51) Int. Cl.
*G06Q 30/00* (2012.01)
*G06F 17/30* (2006.01)
*G06Q 20/32* (2012.01)
*G06Q 30/06* (2012.01)
*G01S 1/00* (2006.01)

(52) U.S. Cl.
CPC .............. *G06Q 20/327* (2013.01); *G01S 1/00* (2013.01); *G06Q 30/0635* (2013.01)

(58) Field of Classification Search
CPC .............................. G06Q 30/0635; G01S 1/00
See application file for complete search history.

(56) References Cited

U.S. PATENT DOCUMENTS

| 9,064,226 | B2 * | 6/2015 | Waller | G06Q 10/087 |
| 9,443,275 | B1 * | 9/2016 | O'Gwynn | G06Q 50/12 |
| 2004/0214597 | A1 * | 10/2004 | Suryanarayana | G06Q 20/20 455/552.1 |
| 2006/0206395 | A1 * | 9/2006 | Vallabh | G06Q 10/08 705/26.1 |
| 2009/0255195 | A1 * | 10/2009 | Bridgman | E04H 14/00 52/174 |
| 2010/0057624 | A1 * | 3/2010 | Hurt | G06Q 20/20 705/76 |
| 2010/0088127 | A1 * | 4/2010 | Betancourt | G06Q 10/02 705/5 |
| 2012/0106781 | A1 * | 5/2012 | Kozitsky | G06Q 10/087 382/103 |

(Continued)

OTHER PUBLICATIONS

Keyser introduces automated drive-thru menu board, Apr. 26, 2013, PR Newswire Association LLC, 4PRN.*

*Primary Examiner* — Michael Misiaszek
*Assistant Examiner* — Matthew Todd
(74) *Attorney, Agent, or Firm* — Haynes and Boone LLP

(57) ABSTRACT

There are provided systems and methods for drive through monitoring using wireless beacons. A merchant may set up a wireless beacon at a drive through location for the merchant. The beacons may provide check-in services to a user when the user arrives at the drive through in a vehicle. The user may be checked-in through a device for the user, such as a mobile phone or a vehicles dashboard console that has communication capabilities with the beacon. Once the device establishes a communication channel with the beacon, check-in information or an identifier is received and associated with an order. The order may previously have been provided to the merchant. The user can complete payment for the order through the device and when the user arrives at a pick-up window, the merchant may utilize another beacon to connect to the device and retrieve the correct order for the user.

19 Claims, 6 Drawing Sheets

(56) References Cited

U.S. PATENT DOCUMENTS

2013/0132286 A1\* 5/2013 Schaefer .............. H04W 4/003
  705/305
2014/0114778 A1\* 4/2014 Miller ................... G06Q 20/20
  705/16

\* cited by examiner

US 9,875,472 B2

DRIVE THROUGH MONITORING USING WIRELESS BEACONS

TECHNICAL FIELD

The present application generally relates to drive through monitoring using wireless beacons and more specifically to monitoring a user's location in a drive through using wireless beacons to expedite payment processes and insure the user receives their correct order.

BACKGROUND

Locations may offer drive through services which expedite a sale process for items (e.g., merchandise, goods, services, tolls, etc.). A user utilizing the drive through services can pull up to an order window and submit and order that can be paid for and picked up further down the drive through. Other drive up or drive through services may include gas pumps, toll road gates, car washes, etc. However, payment for services remains conventional and requires a user to either provide cash or a payment card to complete the transaction. This potentially can be time consuming for the consumer and requires the consumer to have payment instruments on hand. Furthermore, merchants rely on a line to keep orders correct, which commonly can cause incorrect orders to go out to people. For example, fast food drive throughs are notorious for having incorrect orders and/or items when customers arrive at a pick-up window. Additionally, while the line system serves each customer sequentially based on their arrival, certain customers may request items that take longer to prepare or have larger orders. Thus, the line is substantially slowed down for customers who are only picking up small orders, leading to frustration and potentially deterring those customers from ordering when a merchant's drive through line is noticeably long.

Figure 1:
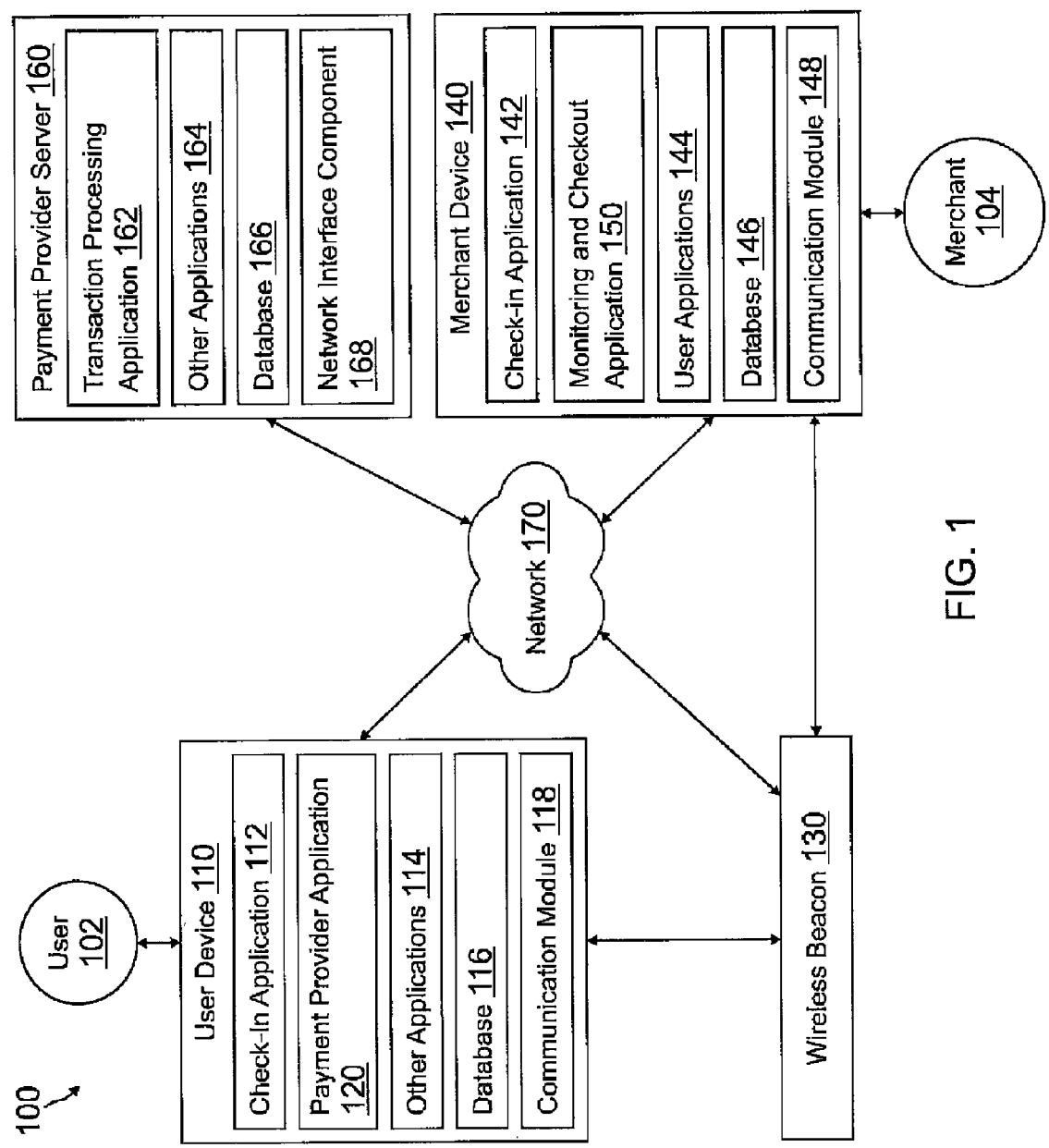
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide drive through monitoring using wireless beacons. Systems suitable for practicing methods of the present disclosure are also provided.

Various locations may provide short range wireless communications with a device, such as through Bluetooth Low Energy (BLE) beacon communications. These beacons may be set up at a location and communicate with devices to alert users of check-in services through their device. The beacons may provide additional functionality, such as establishing a connection with a server entity to complete transactions, including payment services. The beacons may provide communications to the devices directly, including information stored in the beacons. The beacons may also provide communication with a device attached to, or in communication with, the beacon, such as a device of a merchant.

A merchant may offer check-in services and drive through monitoring to users that arrive at a drive through for the merchant. For example, a fast food merchant may have a location that offers a drive through where a user may order and pick-up food while in a vehicle. However, other merchants and services may also provide drive through services, such as toll roads, car washes, pharmacies, and banks. These merchants may utilize a short range wireless beacon at the merchant location to communicate with a device of the user. For example, the short range wireless beacon may be established throughout the drive through, including at an initial entryway, over individual lanes of the drive through, next to an ordering window/intercom, and near a payment and/or pick-up window. The beacons may employ BLE communications that emit a signal receivable by the user's device. The communication may include an identifier for the beacon, the user, the merchant, and/or a payment provider.

The user's device may be set up to passively monitor for BLE communications. When the device detects the signal and verifies the one or more identifiers, both the device and the beacon may ramp up in power and establish a connection, where the connection may further enable the device to communicate with the payment provider or merchant. The beacon may be connected to a networked device at the merchant location, or the beacon may include network functionality to communicate with other devices and/or servers. Thus, the beacon enables the user's device to establish a connection, communicate check-in information (e.g., an identifier for the user), and/or initiate a check-in with the merchant. The check-in may be completed automatically when the user's device is in range of the beacon, or may be completed after prompting the user to check-in when the user's device is in range of the beacon.

The merchant may establish a plurality of wireless beacons at the drive through at the merchant location. The beacons may be set up to connect to the user's device at the start/entrance to the drive through, at checkpoints or predetermined distances within the drive through, at stations in the merchant drive through (e.g., an ordering window/intercom, a payment window or station, and/or a pick-up window or station). Thus, the merchant may monitor the user's movement through the drive through by viewing which beacons the user's device connects to at the drive through. For example, the merchant may determine the user is at an ordering intercom by viewing that the user's device has connected to a wireless beacon at the intercom. The wireless beacons may be range limited to correspond to the merchant station in the drive through that is monitored by that beacon. This may be done by adjusting the power of the signal emitted by the beacon so that connections to devices outside of a radius surrounding the beacon will not pick up a check-in request and/or connect to the beacon. Additionally, the merchant may implement measures to limit the range of the wireless beacon, such as by placing the beacon above the vehicle and utilizing a radiation absorbing matting below the vehicle to limit diffusion of communication signals beyond the merchant station. The beacon may similarly be configured to point the communication signals in a specific direction so as to limit connectivity with the beacon to a specific area.

The user's device that connects to the beacon may correspond to a mobile phone, tablet computer, or other mobile device that a user may utilize. However, in other embodiments, the device may correspond to a vehicles dashboard console that may have a communication module enabling communication with the wireless beacons. The console may further include an interface where the user is alerted of the wireless beacon check-in and where the user may receive further information from the merchant.

The user and/or vehicle may be assigned a number when the device transmits check-in information to a wireless beacon at the merchant location. The number may be associated with a purchase order that the user generates with the merchant. In other embodiments, the merchant may wait until a purchase order is generated by the user before associating the check-in information and/or identifier in the check-in information with the purchase order. Using the wireless beacons, the merchant may monitor the user as the user travels through the drive through. Thus, when the user arrives at a payment and/or pick-up station, the wireless beacon at this station may connect to the user's device and cause the merchant's device to display the correct order for the user. The initial wireless beacon may also have a camera capture an image of the vehicle for the user checking in to the initial beacon. Thus, when the user arrives at the payment/pick-up station, the merchant may view the image and be certain that the user in that vehicle asked for the displayed purchase order.

Based on order size and traffic in the drive through, the user may be directed to specific lanes and/or payment/pick-up windows. For example, a toll booth may direct cars to switch lanes if one or more specific booths are otherwise backed up. In other embodiments, a merchant with multiple drive through lanes may navigate users with small orders to one lane, while using another lane for larger orders that may take longer to fill. Thus, the merchant may increase throughput by assisting users whose orders are simple more quickly and not otherwise backing up the drive through unnecessarily.

The user may also utilize the device to transmit a payment to the merchant, such as through a payment provider. Once a payment is processed, the payment provider may inform the merchant of the payment so that the merchant may transfer the items to the user's possession. In certain embodiments, the user may pay ahead of time, so that when the user arrives at the drive through and the user's device connects to a wireless beacon, the merchant may begin fulfilling their order. Thus, a gas station pump may be activated on check-in with the wireless beacon at the pump, a toll gate or paid garage gate may immediately open, or a merchant may begin preparing food when the user arrives, in various examples.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a merchant 104 a user device 110, wireless beacons 130, a merchant device 140, and payment provider server 160 in communication over a network 170. User 102, such as a consumer or other potential payor, may arrive at a merchant location for merchant 104 that has a drive through. User device 110 may establish a connection with one or more of wireless beacons 130 at the drive through. Merchant 104 may then monitor the location and movement of user 102 through the drive through using connections between user device 110 and wireless beacons 130. Additionally, payment provider server 160 may provide payment services between user device 110 and merchant device 140.

User device 110, wireless beacons 130, merchant device 140, and payment provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented using any appropriate hardware and software configured for wired and/or wireless communication with wireless beacons 130, merchant device 140, and/or payment provider server 160. For example, in one embodiment, user device 110 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in application 112, a payment provider application 120, other applications 114, a database 116, and a communication module 118. Check-in application 112, payment provider application 120, and other applications 114 may correspond to processes, procedures, and/or applications executable by a hardware processor, for example, a software program. In other embodiments, user device 110 may include additional or different software as required.

Check-in application 112 may be used by user 102 of user device 110 to establish a connection with one or more of wireless beacons 130, including a check-in with merchant 104. Check-in application 112 may correspond to a specific application utilized by user device 110 with merchant device 140 to complete a check-in for a location corresponding to wireless beacons 130. The check-in with merchant device 140 may correspond to a process to log in to a user account of user 102 with merchant device 140 (or payment provider server 160 if payment provider server 160 provides check-in services). In other embodiments, the check-in may provide and/or verify the identity of user 102, including transmission of an identifier for user 102 and/or user device 110. The check-in may be completed over network 170 with merchant device 140. In such embodiments, check-in application 112 may correspond more generally to a browser application configured to communicate with merchant device 140.

Check-in application 112 may also receive short range wireless communications from wireless beacons 130 at a location and transmit information to wireless beacons 130, including check-in information for a check-in process with merchant device 140 (or payment provider server 160 if payment provider server 160 provides check-in services) that associates user 102 with the location corresponding to wireless beacons 130. For example, the location for wireless beacons 130 may correspond to a drive through for merchant 104 where wireless beacons 130 is set up to communicate with user device 110 when user device 110 enters the drive through, exits the drive through, is travelling through the drive through, and/or is at a merchant station in the drive through (e.g., a ordering intercom, a payment window, a pick-up window, a toll booth, a gas pump, etc.). In such an example, wireless beacons 130 may be range limited to correspond only to a specific area within the drive through, and a plurality of other beacons may be distributed throughout the drive through, each capable of uniquely connecting to user device 110. Wireless beacons 130 may be set to be range limited, or may be limited to the room by virtue of walls, the structure of wireless beacons 130 (e.g., a directional configuration for wireless signals based on the physical dimensions of wireless beacons 130), radiation absorptive material in the drive through, or other barriers that prevent transmission of communications to user device 110 when user device 110 is not located at the part of the drive through corresponding to the specific wireless beacon, as will be explained in more detail herein. Thus, check-in application 112 may transmit information to one or more of wireless beacons 130 when user 102 is nearby the one or more of wireless beacons 130 (e.g., at the ordering window, gas pump, toll booth, etc.) enabling merchant device 140 to determine the position of user 102 within the drive through.

Check-in application 112 may execute in the background of an operating system of user device 110 and be configured to establish connections, using communication module 118 of user device 110, with one or more of wireless beacons 130. The connection may be established with or without user input from user 102. For example, wireless beacons 130 may broadcast a token, such as a universally unique identifier (UUID), for reception by check-in application 112, as will be explained in more detail herein. Check-in application 112 may utilize communication module 118 of user device 110 to receive the token from wireless beacons 130. If check-in application 112 acknowledges the UUID as identifying wireless beacons 130, merchant device 140, and/or payment provider server 160 (e.g., if check-in application 112 determines the UUID corresponds to a request to complete a check-in), check-in application 112 may transmit an identifier corresponding to user 102 and/or user device 110 back to wireless beacons 130. Check-in application 112 may utilize communication module 118 of user device 110 to communicate with wireless beacons 130 (e.g., over near field communication, Bluetooth, Bluetooth Low Energy, radio, infrared, LTE Direct, or other connection). The identifier from user device 110 may include, be transmitted with, concatenated with, or otherwise bundled with the identifier received from wireless beacons 130. In other embodiments, different information may be transmitted to wireless beacons 130, such as an identifier for user 102, a name or other personal information for user 102, and/or information for the vehicle of user 102 (e.g., a license number, unique identifier, model, color, etc.). Thus, the information transmitted to wireless beacons 130 does not need to be utilized to process and/or complete a check-in with merchant device 140 in all embodiments.

Once a connection is established with wireless beacons 130, user device 110 may be checked-in with merchant device 140 if user 102 has not previously been checked-in. The check-in process may then associate user 102 with the one or more of wireless beacons 130 used to connect to user device 110. For example, merchant 104 may previously have registered wireless beacons 130 as located in a specific area of the drive through location (e.g., at the entrance or a merchant station of the drive through). Thus, merchant 104 is informed that user 102 and the vehicle for user 102 are at the specific area because user device 110 connects to the one or more wireless beacons 130 for that area. As previously discussed, in other embodiments, a check-in need not be processed and/or completed to associate user 102 with the area of the drive through. Thus, other connections and data transfers to the one or more wireless beacons 130 at the specific area may be sufficient to associate user 102 with the specific area.

Payment provider application 120 may be used, for example, to provide a convenient interface to permit user 102 to select payment options and provide payment for items and/or services. For example, payment provider application 120 may be implemented as an application having a user interface enabling the user to enter payment options for storage by user device 140, provide payment to merchant 104, and complete a transaction for the items and/or services using payment provider server 160. In certain embodiments, payment provider application 120 may correspond more generally to a web browser configured to view information available over the Internet or access a website corresponding to a payment provider.

Payment provider application 120 may be configured to provide payment to merchant 104. In this regard, payment provider application 120 may correspond to an application that may provide an interface where user 102 may view a purchase order for items requested by user 102. Additionally, user 102 may generate a payment request for the purchase order to merchant 104. The payment request may instruct payment provider server 160 to provide payment for the purchase order to merchant 104. Additionally, the payment request may denote a payment instrument that payment provider server 160 may utilize to provide the payment to merchant 104. Payment provider application 120 may correspond to a dedicated application for payment provider server 160 (e.g., a specific device application) or may correspond to a browser application.

The payment request may correspond to a token including the selected payment instrument for user 102. The payment instrument may include an account identifier, payment card, bank account, etc. Once the payment request is generated, user 102 may authorize the payment request for transmission to payment provider server 160 in order to effectuate a payment to merchant 104. User device 140 may transmit the payment request to payment provider server 160 with an identifier for merchant 104 in order to complete the payment to merchant 104. In other embodiments, payment provider application 120 may transmit the payment request as a token with a payment instrument and identifier for user 102 to merchant device 140 for completion by merchant 104.

Payment provider application 120 may provide payment for items using a user account with the payment provider, such as payment provider server 160. Payment provider application 120 may include cross-linking, allowing user 102 to identify a user account through an identifier for a separate user account (e.g. identifying a user account through a debit card account number and vice versa). Payment provider application 120 may further include options to store transaction histories for purchased items, such as receipts, for later use. Thus, payment provider application 120 provides an interface enabling user 102 to provide proof of purchase to merchant 104.

In various embodiments, one or more features of check-in application 112 and/or payment provider application 120 may be incorporated in the same application so as to provide their respective features in one application.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications associated with payment provider server 160. Other applications 114 may include browser, social networking, and/or mapping applications, which may also be used in conjunction with check-in application 112 and/or payment provider application 120. Other applications 114 may contain software programs, executable by a processor, including a graphical user interface (GUI) configured to provide an interface to the user.

User device 110 may further include database 116 which may include, for example, identifiers such as operating system registry entries, cookies associated with check-in application 112, payment provider application 120, and/or other applications 114, identifiers associated with hardware of user device 110, or other appropriate identifiers, such as identifiers used for payment/user/device authentication or identification. Identifiers in database 116 may be used by a payment/credit provider, such as payment provider server 160, to associate user device 110 with a particular account maintained by the payment/credit provider. Database 116 may include user device tokens and/or encryption keys, including an encryption key of wireless beacons 130, merchant device 140, and/or payment provider server 160. Database 116 may include identifying information for tokens enabling check-in application 112 to identify wireless beacons 130, merchant device 140, and/or payment provider server 160 when receiving a corresponding check-in token.

User device 110 includes at least one communication module 118 adapted to communicate with wireless beacons 130, merchant device 140, and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacons 130 using short range communications, such as Bluetooth Low Energy, LTE Direct, radio frequency, infrared, Bluetooth, and near field communications.

Wireless beacons 130 may be maintained, for example, by merchant 104 and/or payment provider server 160. Wireless beacons 130 may be implemented using any appropriate hardware and software configured for wireless communication with user device 110. For example, in one embodiment, one or more of wireless beacons 130 may be implemented as a dongle device including a hardware processor and a communication module, for example, connected to device at the location of merchant 104. Wireless beacons 130 may also be implemented as devices incorporated within a personal computer (PC), a smart phone, laptop computer, and/or other types of computing devices capable of transmitting and/or receiving data, such as an IPAD® from APPLE®. Wireless beacons 130 may also act as stand-alone devices including a processor, communication module, and/or network interface component configured to communicate with user device 110 and/or payment provider server 160. Although wireless beacons 130 are described as a plurality of wireless beacons set up at merchant stations through a drive through, in various embodiments, wireless beacons 130 may correspond to a single wireless beacon established at one merchant station, such as an ordering intercom, gas pump, car wash entrance, etc.

Wireless beacons 130 may be located at a physical location corresponding to merchant 104. A physical location corresponding to merchant 104 may constitute a drive through and/or merchant station. Each of wireless beacons 130 may be established in a specific spot of the drive through and limited, either by signal range or physical boundaries, to a specific merchant station or spot in the drive through. For example, one of wireless beacons 130 may be established at the entrance to the drive through, at an ordering station, and at a payment/pick-up station. Wireless beacons 130 of FIG. 1 contains processes, procedures, and/or applications executable by a hardware processor, for example, a software program, configured to interact with user device 110, merchant device 140, and/or payment provider server 160. Thus, regardless of the implementation of wireless beacons 130 as discussed above, each of wireless beacons 130 may utilize a check-in process and include or be connected to a communication module. In other embodiments, wireless beacons 130 may include additional or different software and devices as required.

Each of wireless beacons 130 may include an application for transmitting requests to establish a connection between a device (e.g., user device 110) and one of wireless beacons 130. The requests may be unique to each of wireless beacons 130 and form a connection with only the matching one of wireless beacons 130. Thus, wireless beacons 130 may utilize short range wireless communications of wireless beacons 130 to transmit the requests to establish a connection, including an identifier such as a Universally Unique Identifier (UUID). If user device 110 receives a request to establish the connection with wireless beacons 130 and responds with an identifier for user 102/user device 110 (potentially including the UUID and other information necessary to effectuate a check-in for user 102), wireless beacons 130 to ramp up in power and create a connection between user device 110 and one of wireless beacons 130.

Each of wireless beacons 130 may uniquely transmit the request to establish the connection with wireless beacons 130 as a short range wireless communication (e.g. a BLE protocol communication) including a "wake up" process for check-in application 112 of user device 110 and/or a token for the one of wireless beacons 130 transmitting the request. In other embodiments, the request and/or connection may utilize near field communication, radio communication, infrared communication, or Bluetooth communication. Additionally, although wireless beacons 130 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacons 130 (e.g., user device 110 and/or merchant device 140) and establishment of a connection for data transfers The request may be specific to user device 110 by including information that is specific to user 102, such as a name, identifier, or user device identifier. The information specific to user 102 may be determined from a user account of user 102 or other information previously provided to merchant device 140 and/or payment provider server 160. Thus, in certain embodiments, only user device 110 will pick up and authenticate the request. In other embodiments, user device 110 may only pick up the request based on the signal range and/or physical context for one of wireless beacons 130 transmitting the request. For example, one of wireless beacons 130 established at an ordering intercom may be limited in range only to connect to user device 110 if user device 110 is located in proximity to the ordering intercom.

After one of wireless beacons 130 receives an identifier from user device 110, the one of wireless beacons 130 may determine user 102 is in proximity to itself. Thus, the one of wireless beacons 130 receiving the identifier may pass the identifier to merchant device 140 and/or payment provider server 160 to associate user 102 (and thus user device 110 and a vehicle user 102 is travelling in) with the particular one of wireless beacons 130 that received the identifier. By associating user 102 with the particular one of wireless beacons 130 receiving the identifier, merchant device 140 and/or payment provider server 160 may determine a location for user 102 in the drive through or at the merchant location. Wireless beacons 130 may utilize a communication module to pass the identifier to merchant device 140, which may then pass the identifier to payment provider server 160. However, in other embodiments, wireless beacons 130 may utilize a network connection of wireless beacons 130 to pass the identifier to payment provider server 160 directly. Thus, each of wireless beacons 130 includes a communication module adapted to communicate with user device 110, merchant device 140, and/or payment provider server 160. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module may communicate with user device 110 and/or merchant device 140 using short range communications, such as Bluetooth Low Energy, LTE Direct, radio frequency, infrared, Bluetooth, and near field communications.

Merchant device 140 may be implemented using any appropriate hardware and software configured for wired and/or wireless communication with user device 110, wireless beacons 130, and/or payment provider server 160. For example, merchant device 140 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly. Moreover, in various embodiments, one or more of the applications, processes, and/or features discussed below in reference to merchant device 140 may be included in payment provider server 160, and vice versa.

Merchant device 140 of FIG. 1 contains a check-in application 142, a monitoring and checkout application 150, other applications 144, a database 146, and a communication module 148. Check-in application 142, monitoring and checkout application 150, and other applications 144 may correspond to processes, procedures, and/or applications executable by a hardware processor, for example, a software program. In other embodiments, merchant device 140 may include additional or different software as required.

Check-in application 142 may correspond to processes to complete check-in with user device 110 for a location corresponding to merchant 104 (e.g., with one or more of wireless beacons 130 established in a merchant location for merchant 104). Thus, check-in application 142 may correspond to the merchant device side application configured to receive check-in information from user device 110 and complete the check-in. The check-in request may include log in information for a user account with merchant 104 and/or payment provider server 160 and thus complete the check-in with user 102 by verifying the account information. For example, the check-in information may include an identifier or other account information for a user/payment account of user 102. However, in embodiments where a user account has not been previously established by user 102, check-in application 142 may receive other information identifying user 102 and/or merchant 104, including a user name/identifier, user device identifier, an identifier for an account with another server, or other information. The check-in information may also be utilized to pull up a previous order and complete a transaction for user 102. For example, the check-in information may include an identifier for user 102 that enables merchant device 140 to identify a food order, prepaid gas amount, prepaid toll, or other previously established order.

Once check-in is completed between user device 110 and wireless beacons 130, monitoring and checkout application 150 may be utilized to transmit and receive information between user device 110 and merchant device 140. Monitoring and checkout application 150 may be used, for example, to provide a convenient interface to permit merchant 104 to view check-in information and/or location information for user 102 at a merchant location for merchant 104. In this respect, monitoring and checkout application 150 may receive check-in information, an identifier, or other connection information when user device 110 connects to one or more of wireless beacons 130. As previously discussed, when user device 110 connects to one of wireless beacons 130, user device 110, and thus user 102 and/or any vehicle user 102 is travelling in, is associated with a beacon of wireless beacons 130 that is connected to user device 110. Since the connected beacon is associated with the location, such as a merchant station (e.g., gas pump, toll booth, window, entrance) or a location in a drive through (e.g., lane, entrance, distance marker in a lane, ordering/payment/pick-up spot), monitoring and checkout application 150 may determine that user 102 is located at the location for the connected beacon of wireless beacons 130.

Based on the location of user 102 at the merchant location for merchant 104, monitoring and checkout application 150 may take various actions. In one embodiment, the beacon of wireless beacons 130 that user device 110 connects to is located at an entrance to a drive through. If the drive through has multiple lanes, user 102 may be directed to a lane with the least traffic. Moreover, based on the orders in each lane (e.g., small or fast to fulfill orders vs. large or long to fulfill orders); user 102 may be directed to the fastest or most appropriate lane. The beacon of wireless beacon 130 may also be located at an ordering station, such as an intercom in a drive through. Thus, the identifier used to connect to one or wireless beacons 130 may be associated with an order submitted by user 102 at the ordering station. When user device 110 later connects to another one of wireless beacons 130 at a payment or a pick-up window, the correct order may be recalled by monitoring and checkout application 150 using the identifier so that the order is displayed to merchant 104. Moreover, when user 102 first places the order, an image of the vehicle user 102 is travelling in may be captured and further tied to the order and the identifier so that merchant 104 may have further faith that user 102's order is correct when the image, order, and identifier recalled by monitoring and checkout application 150.

Based on the order submitted by user 102, monitoring and checkout application 150 may also direct user 102 to different lanes, checkout windows, etc., when travelling through the drive through. For example, user 102 may only request a coffee. Thus, if another user has ordered 4 meals for a family in a vehicle, user 102 may be diverted to a different lane in the drive through having users with all small/quick orders or may be diverted to a lane ahead of the other user to reduce wait times for user 102. Wireless beacons 130 may actively monitor each lane to determine which users are in each lane, what their orders are, their place in the lane, and the length of the lane using the identifiers for each of those users and their associated orders. Thus, monitoring and checkout application 150 may determine or estimate an average wait time in each lane, a traffic flow of each lane, and a best lane for each user as they arrive at the merchant location for merchant 104 and/or submit orders.

As previously discussed, one or more of wireless beacons 130 may be located at payment and/or pick-up windows. Thus, monitoring and checkout application 150 may receive information for a connection between user device 110 and the beacon(s) of wireless beacons 130 located at the payment/pick-up window(s). Monitoring and checkout application 150 may recall the order for user 102 when user device 110 and the beacon form a connection and display the order to merchant 104. Merchant 104 may the process a payment, including a payment by user 102 using payment provider server 160. Monitoring and checkout application 150 may transmit a payment token to user device 110, where the payment token may have the order for user 102 (e.g., an order user 102 utilizes user device 110 to generate) and/or a payment total merchant 104 generates in response to the order. Monitoring and checkout application 150 may receive confirmation of payment to an account of merchant 104, such as payment information and transaction histories that complete the payment. In other embodiments, user device 110 may provide the payment instrument and authorization (e.g., an account identifier, payment instrument, and/or token including additional payment information) to merchant device 140 for completion by monitoring and checkout application 150 using payment provider server 160.

In another embodiment, user 102 may establish an order with merchant 104 prior to arriving at the merchant location for merchant 104. The order may be paid prior to user 102 arriving at the merchant location or during payment/pick-up at the merchant location. In such embodiments, when user device 110 connects to one or more of wireless beacons 130 at the location, the order may be recalled and prepared for user 102. In certain embodiments, the order may be authorized or completed as soon as user 102 connects to one of wireless beacons 130. For example, a beacon of wireless beacons 130 established at a specific gas pump, a toll booth, an entrance to a car wash, or another site where user 102 is required to pay for authorization to use, may activate the gas pump (including for a pre-purchased amount), authorize the toll and provide admission to user 102, activate and enable access to the car wash, or otherwise permit user 102 to utilize the item/location/service.

Merchant device 140 includes other applications 144 as may be desired in particular embodiments to provide features to merchant device 140. For example, other applications 144 may include security applications for implementing client-side security features, programmatic client applications for interfacing with appropriate application programming interfaces (APIs) over network 170, or other types of applications. Other applications 144 may also include email, texting, voice and IM applications that allow a merchant 104 to send and receive emails, calls, texts, and other notifications through network 170. In various embodiments, other applications 144 may include financial applications, such as banking, online payments, money transfer, or other applications associated with payment provider server 160. Other applications 144 may contain other software programs, executable by a processor, including a graphical user interface (GUI) configured to provide an interface to the user.

Merchant device 140 may further include database 146 which may include, for example, identifiers such as operating system registry entries, cookies associated with check-in application 142, monitoring and checkout application 150, and/or other applications 144, identifiers associated with hardware of merchant device 140, or other appropriate identifiers, such as identifiers used for payment/user/device authentication or identification. In one embodiment, identifiers in database 146 may be used by payment provider server 160 to associate merchant device 140 with a particular account maintained by payment provider server 160. Database 146 may also store user 102's information, including check-in information, an identifier, etc., for user 102. Database 146 may include orders by user 102 and transaction histories for purchased items by user 102 to present proof of purchase.

Merchant device 140 includes at least one communication module 148 adapted to communicate with user device 110, wireless beacons 130, and/or payment provider server 160. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with wireless beacons 130 using short range communications, such as Bluetooth Low Energy, LTE Direct, radio frequency, infrared, Bluetooth, and near field communications.

Payment provider server 160 may be maintained, for example, by an online payment service provider, which may provide payment services and/or processing for financial transactions on behalf of a user. In this regard, payment provider server 160 includes one or more processing applications which may be configured to interact with user device 110, wireless beacons 130, and/or merchant device 140 to facilitate payment for a transaction. In one example, payment provider server 160 may be provided by PAYPAL®, Inc. of San Jose, Calif., USA. However, in other embodiments, payment provider server 160 may be maintained by or include a credit provider, financial services provider, financial data provider, and/or other service provider, which may provide payment services to user 102 and/or merchant 104. Moreover, in various embodiments, one or more of the applications, processes, and/or features discussed below in reference to payment provider server 160 may be included in merchant device 140, and vice versa.

Payment provider server 160 of FIG. 1 includes a transaction processing application 162, other applications 164, a database 166, and a network interface component 168. Transaction processing application 162 and other applications 164 may correspond to processes, procedures, and/or applications executable by a hardware processor, for example, a software program. In other embodiments, payment provider server 160 may include additional or different software as required, such as a check-in application and/or a monitoring application as discussed in reference to merchant device 140, where those features are instead provided by payment provider server 160.

Transaction processing application 162 may be configured to receive information from and/or transmit information to user device 110 and/or merchant device 140 for processing and completion of financial transactions. Transaction processing application 162 may include one or more applications to process financial transaction information from user 102 and merchant 104 by receiving a request to complete transaction for items and/or services offered by merchant 104. The request may correspond to a payment from user 102 to merchant 104. The payment may include a user account identifier or other payment information (e.g. a credit/debit card or checking account) for user 102 and a receiving account for merchant 104. Additionally, the payment may include a payment amount and terms of payment. Transaction processing application 162 may complete the transaction by providing payment to merchant 104 through the receiving account/payment information. Additionally, transaction processing application 162 may provide transaction histories, including receipts, to user device 110 and/or merchant device 140 for completion and documentation of the financial transaction. For example, a transaction history may be provided to user device 110 and/or merchant device 140 to allow for merchant 104 to view the transaction and provide the items and/or services to user 102.

In various embodiments, payment provider server 160 includes other applications 164 as may be desired in particular embodiments to provide features to payment provider server 160. For example, other applications 164 may include security applications for implementing server-side security features, programmatic server applications for interfacing with appropriate application programming interfaces (APIs) over network 170, or other types of applications. Other applications 164 may contain software programs, executable by a processor, including a graphical user interface (GUI), configured to provide an interface to a user.

Additionally, payment provider server 160 includes database 166. As previously discussed, user 102 and/or merchant 104 may establish one or more payment accounts with payment provider server 160. User accounts in database 166 may include merchant/user information, such as name, address, birthdate, payment/funding information, additional user financial information, and/or other desired user data. User 102 and/or merchant 104 may link to their respective payment accounts through a user, merchant, and/or device identifier. Thus, when an identifier is transmitted to payment provider server 160, e.g. from user device 110 and/or merchant device 140, a payment account belonging to user 102 and/or merchant 104 may be found. In other embodiments, user 102 and/or merchant 104 may not have previously established a payment account and may provide other financial information to payment provider server 160 to complete financial transactions, as previously discussed.

In various embodiments, payment provider server 160 includes at least one network interface component 168 adapted to communicate user device 110, wireless beacons 130, and/or merchant device 140 over network 170. In various embodiments, network interface component 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2A:
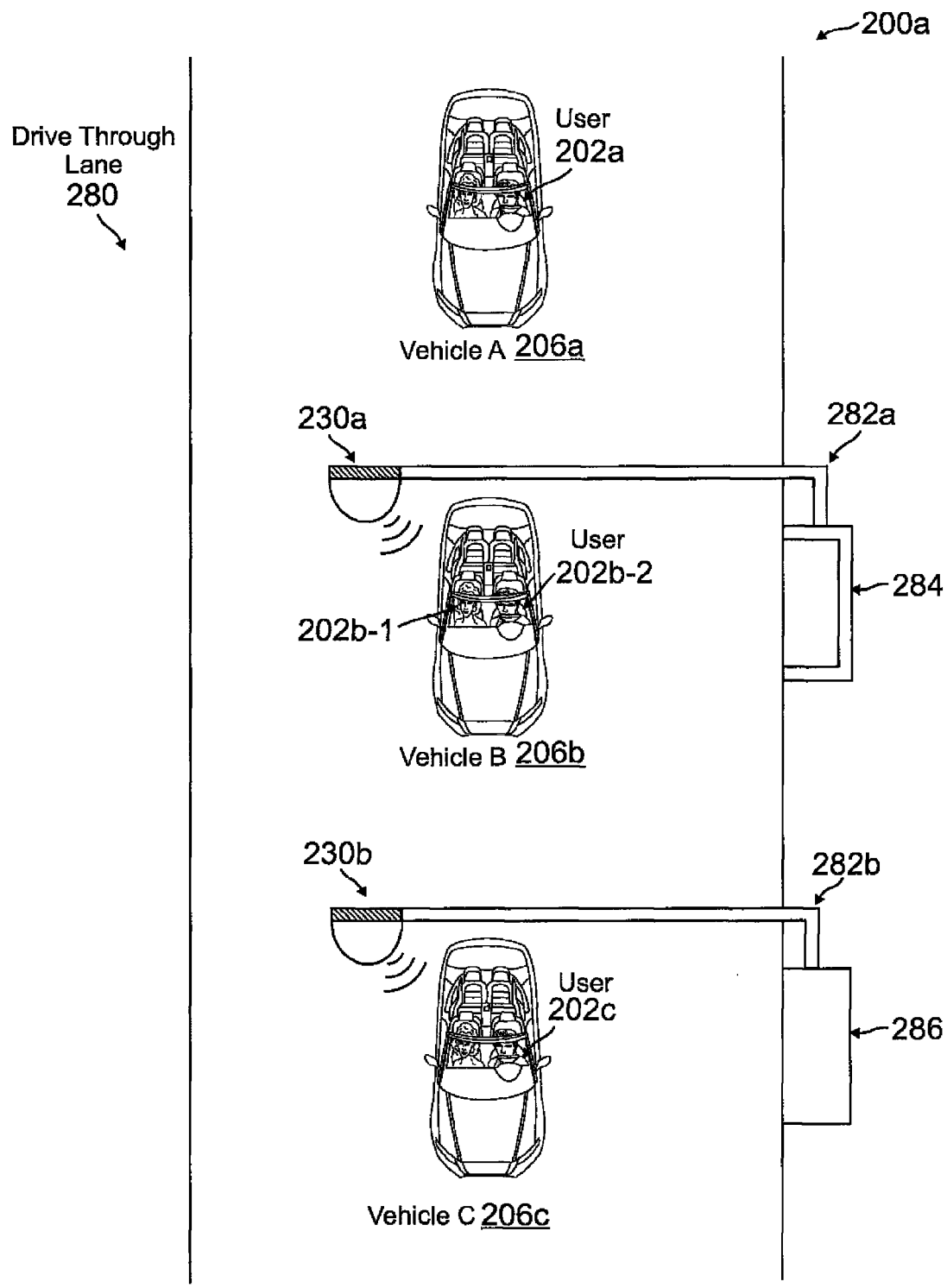
FIG. 2A is an exemplary environment showing multiple cars situated in a drive through that uses wireless beacons to monitor the cars in the drive through, according to an embodiment.

FIG. 2A is an exemplary environment showing multiple cars situated in a drive through that uses wireless beacons to monitor the cars in the drive through, according to an embodiment. Environment 200a of FIG. 2 includes a user 202a, a user 202b-1, a user 202b-2, and a user 202c all corresponding generally to user 102 operating user device 110 of FIG. 1. Moreover, environment 200 includes a wireless beacon 230a and a wireless beacon 230b corresponding generally to wireless beacons 130 of FIG. 1.

Environment 200a includes a drive through lane 280 with a vehicle A 206a, a vehicle B 206b, and a vehicle C 206c. Vehicle A 206a includes user 202a just arriving at drive through lane 280. Additionally, vehicle B 206b includes user 206b-1 and 206b-2 at an ordering station 284. Ordering station 284 may correspond to an ordering intercom and menu where user 206b-1 and 206b-2 may submit an order to a merchant. In other embodiments, ordering station 284 may correspond to other stations, such as windows, interactive menus, and similar areas at a merchant location. Vehicle C 206c includes user 202c at a pick-up station 286. Pick-up station 286 may correspond to a payment and/or pick-up window where a user may render payment and pick-up items the user wishes to purchase.

As shown in environment 200a, drive through lane 280 includes wireless beacon 230a at ordering station 284 that is positioned in drive through lane 280 using a structure 282a. Structure 282a may correspond to a physical structure that may orient wireless beacon 230a so that wireless beacon 230a only connects to wireless devices in proximity to ordering station 284. Similarly, wireless beacon 230b at pick-up station 286 is positioned in drive through lane 280 using a structure 282b that limits wireless beacon 230b to only connect to devices in proximity to pick-up station 286. Drive through lane 280 may also be configured to limit the range of wireless beacons 230a and 230b, for example, using walls, turns, radiation absorbing materials, or other physical dimensions. Moreover, wireless beacons 230a and 230b may be configured to limit the range of connectivity to devices using the physical structure of wireless beacons 230a and 230b or the signal strength of wireless beacons 230a and 230b.

Thus, as vehicle A 206a arrives, user 202a is does not connect to a wireless beacon and the merchant for drive through lane 280 is unaware of user 202a. However, as user 202b-1 and user 202b-1 arrive at ordering station 284 in vehicle B 206b, wireless beacon 230a may connect to one or more devices in possession of user 202b-1 and user 202b-2. Wireless beacon 230a may broadcast a request to check-in/connect that is specific to a certain device of user 202b-1 or user 202b-2, or any device that connects to wireless beacon 230a may be utilized as the identifier associated with a purchase order that user 202b-1 or user 202b-2 submits at ordering station 284. Since user 202b-1 and user 202b-2 will travel in vehicle B 206b to wireless beacon 230b, any device corresponding to vehicle B 206b is sufficient to be utilized with the purchase order so that the correct purchase order may be recalled at pick-up station 286.

When user 202c arrives at pick-up window 286 in vehicle C 206c, a device corresponding to vehicle C 206c (e.g., a mobile phone, tablet computer, car display console, etc.) may connect to wireless beacon 230b for pick-up window 286. When the device connects to wireless beacons 230b, a purchase order that user 202c has previously submitted may be recalled and displayed to a merchant at pick-up window 286. User 202c may then utilize the device to complete a payment with the merchant for the purchase order, or may render a payment instrument (e.g., cash, check, payment card, gift entitlement, etc.) to the merchant at pick-up window 286. If user 202c has already paid, or once user 202c pays, the merchant may transfer the items, goods, services, etc., to user 202c.

Figure 2B:
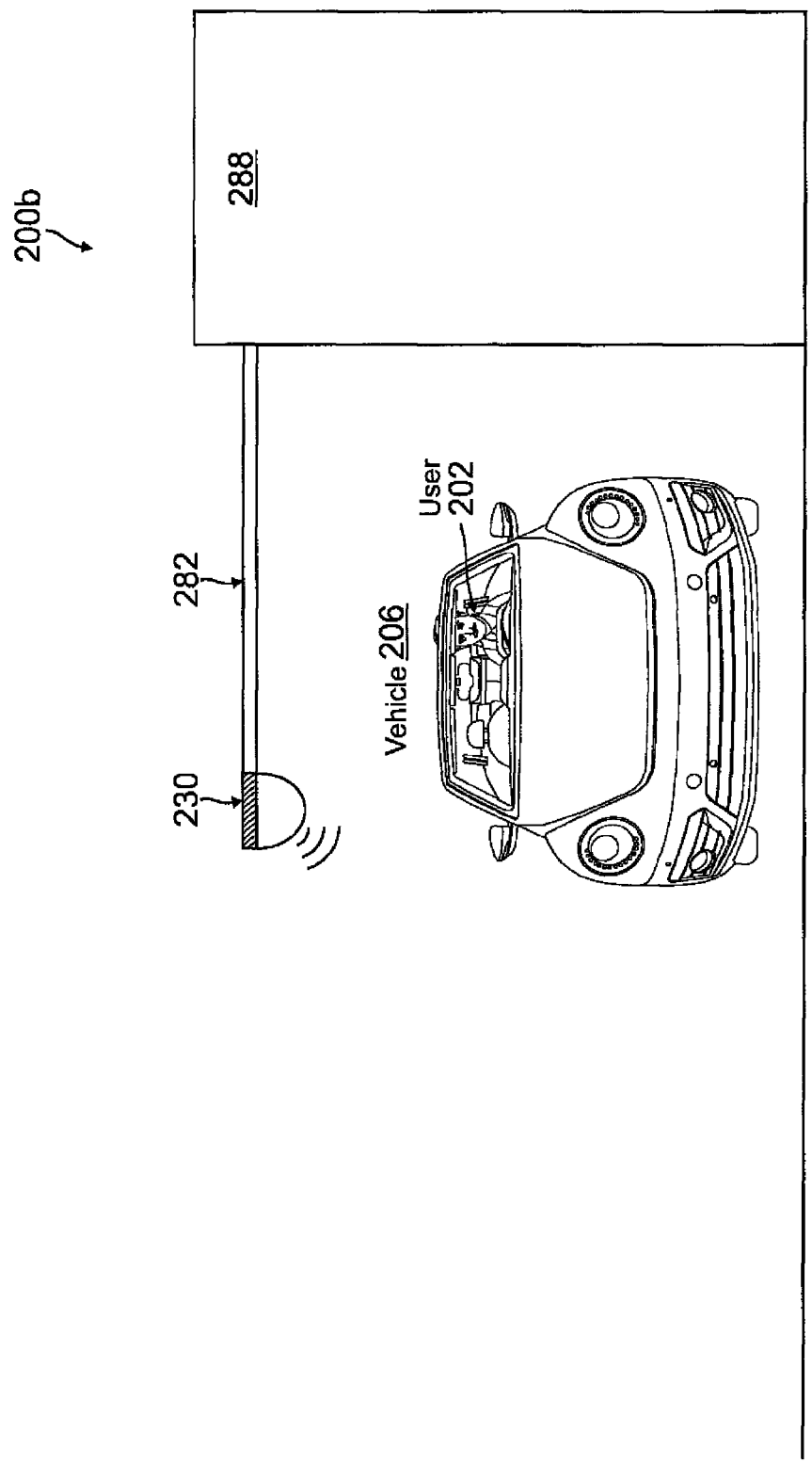
FIG. 2B is an exemplary environment showing a single car at a merchant station that utilizes a wireless beacon, according to an embodiment.

FIG. 2B is an exemplary environment showing a single car at a merchant station that utilizes a wireless beacon, according to an embodiment. Environment 200b of FIG. 2B includes a user 202 corresponding generally to user 102 of FIG. 1. Additionally, environment 200b includes a wireless beacon 230 corresponding generally to one of wireless beacons 130 of FIG. 1.

A merchant station 288 includes wireless beacon 230 arranged in proximity to merchant station 288 using a structure 282 in order to provide communications with a device held by user 202 at merchant station 288. Wireless beacon 230 may similarly be range limited to only connect to a device in proximity to merchant station 288, such as the size of an average vehicle that frequents merchant station 288 (e.g., car, truck, shipping truck, boat, recreational vehicle, plane, etc.). As shown in environment 200b, wireless beacon 230 may connect to the device of user 202 by being located over a vehicle 206 transporting user 202. Wireless beacon 230 may be aimed downward and communication signals may be aimed directionally toward user 202 and vehicle 206. Additionally, below vehicle 206 may be radiation absorbing material that prevents the diffusion of the communication signals.

In environment 200b, merchant station 288 may correspond to a gas station pump, a toll booth, a car wash entrance, a merchant pick-up window, a bank teller window, or any other drive up item and/or service window that performs a function with user 202. Since wireless beacon 230 connects to a device for user 202 in vehicle 206, merchant station 288 may render the item and/or service to user 202 as soon as user 202 arrives at merchant station 288. Thus, wireless beacon 230 may alert a merchant, service person, etc., at merchant station 288 that may render the items/services to user 202, or may be automated to engage merchant station 288 to render the items to user 202 when user 202 arrives and a device for user 202 connects to wireless beacon 230.

Figure 3:
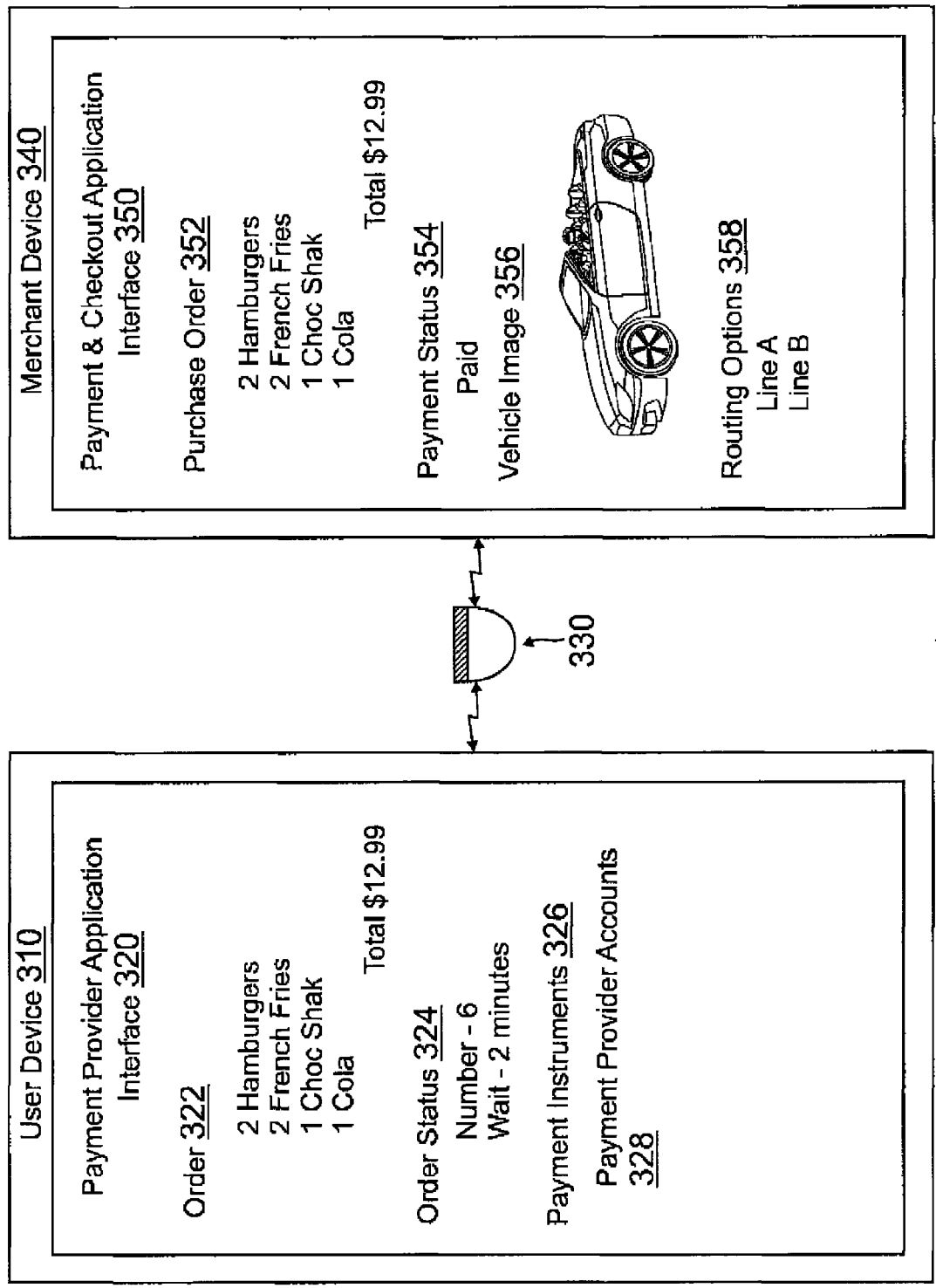
FIG. 3 is an exemplary system environment showing display screens of a user device and a merchant device during ordering and payment for items in a drive through monitored by wireless beacons, according to an embodiment.

FIG. 3 is an exemplary system environment showing display screens of a user device and a merchant device during ordering and payment for items in a drive through monitored by wireless beacons, according to an embodiment. Environment 300 includes a user device 310, a wireless beacon 330, and a merchant device 340 corresponding generally to user device 110, wireless beacon 330, and merchant device 140, respectively, of FIG. 1.

User device 310 displays a payment provider application interface 320 corresponding generally to the processes and features described in reference to payment provider application 120 of FIG. 1. User device 310 may further include a check-in application discussed in reference to user device 110 that may establish a connection with wireless beacon 330. Wireless beacon 330 may be situated at a payment and/or pickup merchant station for merchant device 340. After a connection is established, user device 310 may display payment provider application interface 320 in order to generate and complete an order with merchant device 340. Payment provider application interface 320 includes an order 322, an order status 324, payment instruments 326, and payment provider accounts 328. Order 322 may correspond to ordered items by a user of user device 310. The user may utilize payment provider application interface 320 to enter order 322, or order 322 may be populated after the user tells a merchant for merchant device 340 order 322 and it is entered to merchant device 340. Order 322 may include a payment total for an amount that the user may be required to pay the merchant. Additionally, the user may be shown order status 324 that display a number, wait time, line order, or other information that may be inform the user of user device 310 of the status, wait time, and/or line routing for order 322.

In order to provide payment, the user of user device 310 may utilize payment instruments 326. Payment instruments 326 may include payment cards, gift entitlements, discounts, and/or payment accounts with a payment provider. Thus, payment instruments 326 includes payment provider accounts 328 that the user of user device 310 may utilize to complete payment for order 322. Selection of one or more of payment instruments 326 may engage merchant device 340 to complete a payment for order 322.

The connection and/or check-in for user device 310 with wireless beacon 330 may also be completed with a check-in application for merchant device 340. Once user device 310 connects to wireless beacon 330 and/or completes a check-in, merchant device 340 may also begin receiving information from user device 310 and providing information to user device 310. For example, a merchant for merchant device 340 may view a payment and checkout application interface 350. Payment and checkout application interface 350 includes a purchase order 352, a payment status 354, a vehicle image 356, and routing options 358. As previously discussed, the user for user device 310 may establish order 322, which similarly may be displayed on merchant device 340. However, purchase order 352 may only populate in payment and checkout application interface 350 when user device 310 connects to wireless beacon 330, thereby information merchant device 340 that user device 310 is in proximity to wireless beacon 330 and thus the payment and/or pick-up station corresponding to wireless beacon 330. Purchase order 352 may be utilized by the merchant for merchant device 340 to obtain the correct items for the user and double check the order the merchant is giving the user. The merchant viewing merchant device 340 may also view payment status 354, informing the merchant that the user has paid and the merchant may relinquish the items to the user. Additionally, to further insure the merchant has the correct order for the user, the merchant may match vehicle image 356 to the vehicle at the merchant station.

The merchant utilizing merchant device 340 may also access routing options 358, which may be utilized to route one or more users to correct lanes and windows in order to streamline and expedite an experience with the merchant. Thus, the merchant may select routing options 358 to view vehicles and their purchase orders in line A and line B, and make decisions or rearrange the lines as necessary. Routing options 358 may also be chosen by merchant device 340 based on parameters entered by the merchant, such as order size, cost, payment instrument, etc.

Figure 4:
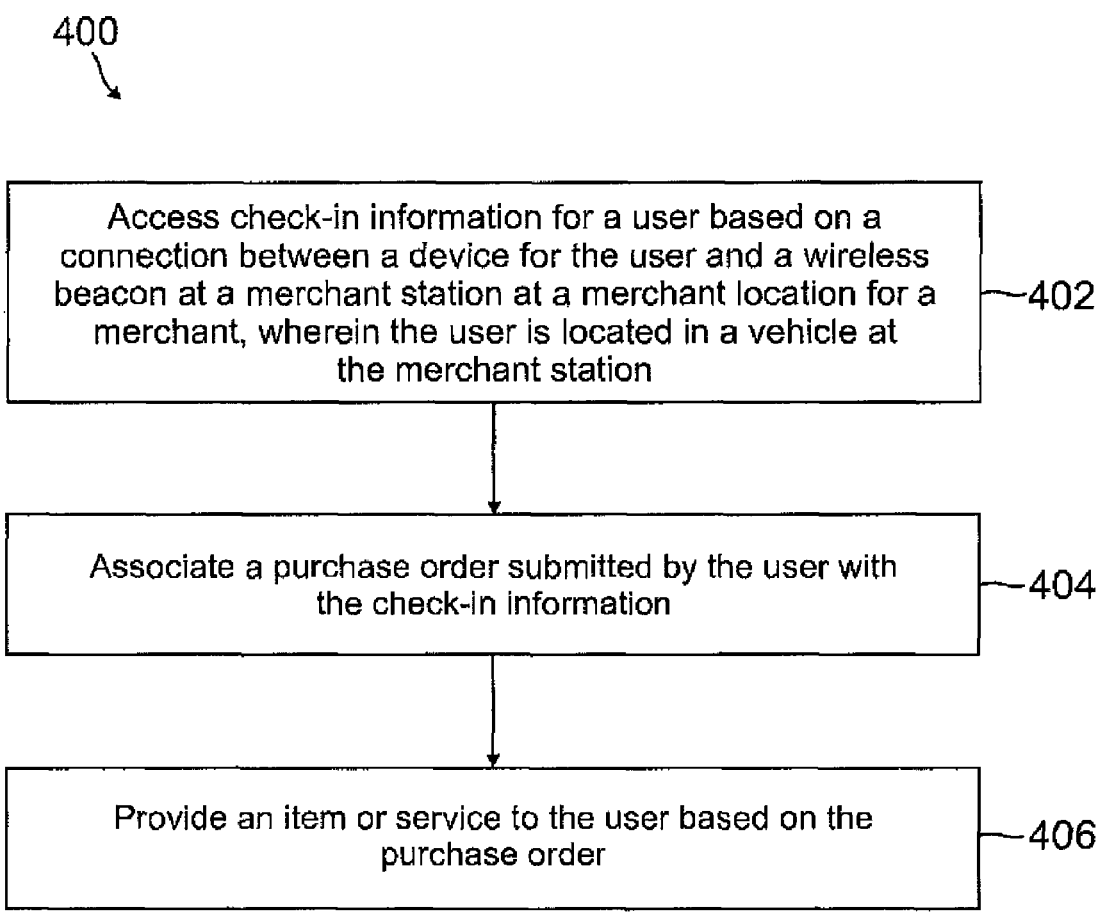
FIG. 4 is a flowchart of an exemplary process by a server for drive through monitoring using wireless beacons, according to an embodiment.

FIG. 4 is a flowchart of an exemplary process by a server for drive through monitoring using wireless beacons, according to an embodiment. Note that one or more steps, processes, and methods described herein may be omitted, performed in a different sequence, or combined as desired or appropriate.

At step 402, check-in information for a user is accessed based on a connection between a device for the user and a wireless beacon at a merchant station at a merchant location for a merchant, wherein the user is located in a vehicle at the merchant station. For example, the check-in information may be received when the user connects to a wireless beacon in a merchant location accessible by a vehicle. The wireless beacon may be a first wireless beacon of a plurality of wireless beacons at the merchant location. The device and the first wireless beacon may connect using one of near field communication, radio communication, infrared communication, Bluetooth communication, Bluetooth Low Energy (BLE) communication, and LTE Direct communication. The device may comprise a dashboard console device in the first vehicle. Additionally, the wireless beacon may be range limited to connect to the device within an area associated with the merchant station. For example, the merchant station may comprise an ordering window or an intercom, and the area may comprise a length of an average vehicle utilizing the merchant location. Thus, the wireless beacon may include a directional antenna or construction of the wireless beacon that is configured to define the area where the wireless beacon may connect to devices. In other embodiments, construction of the drive through, the merchant station, or other physical boundary may define the area where the wireless beacon may connect to devices.

A purchase order submitted by the user is associated with the check-in information, at step 404. Additionally, an image of the vehicle may be received when the device connects to the wireless beacon, which is then associated with the purchase order and/or presented to the merchant with the purchase order. In other embodiments, a purchase order submitted by the user may be determined using the check-in information. For example, the user may submit and/or pay for the purchase order before the device of the user connects to the wireless beacon. Thus, the purchase order may be displayed to the user at the merchant station, and the user may update or confirm the purchase order at the first drive through station. A payment for the purchase order may be processed using a payment provider or a payment instrument provided by the user to the merchant at another merchant station. Thus, when the user arrives at another merchant station, the purchase order may be presented to the merchant so that the merchant may processes the payment, prepare the order, and confirm the order's contents.

At step 406, an item or service is provided to the user based on the purchase order. The item or service may comprise one of gasoline, prescription medication, food, access to a toll road, and a carwash. The items and/or services may be provided to the user when the vehicle is located at another merchant station, as determined using a connection between the device of the user and another wireless beacon at the other merchant station. In various embodiments, prior to providing the user items and/or services, a transaction history may be communicated to the merchant, wherein the transaction history comprises information for the payment to the merchant. In various embodiments, another vehicle may arrive at the merchant location and connect to the wireless beacon. Thus, the location for the first vehicle that arrived, and the second vehicle that arrived may be tracked, and the purchase order for the first vehicle may be associated with the location of the first vehicle.

Figure 5:
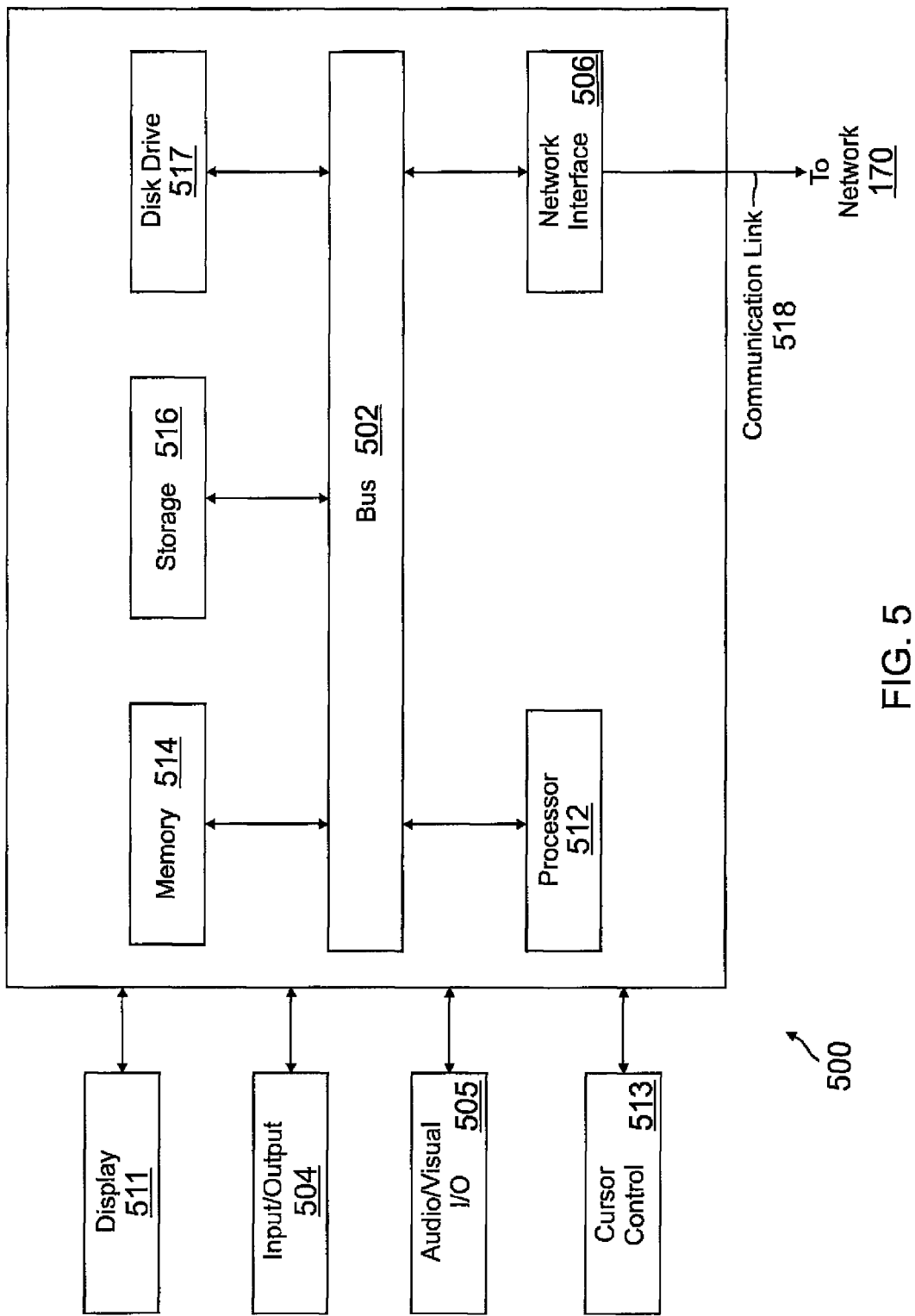
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing check-in information for a user; and
one or more hardware processors configured to execute instructions to cause the system to perform operations comprising:
receiving the check-in information for the user when a device of the user connects to a first wireless beacon at a first merchant station in a merchant location for a merchant, wherein the merchant location is accessible by a vehicle for the user;
assigning, using the check-in information, an identifier to the device of the user based on a purchase order submitted at the first merchant station;
associating the purchase order with the identifier;
directing, using a display device at the first merchant station, the user to a lane for the vehicle at the merchant location based on the purchase order;
in response to determining that the vehicle is located at a second merchant station along the lane when the device connects to a second wireless beacon at the second merchant station through short range wireless communications, communicating, using the second wireless beacon at the second merchant station, data for the purchase order to the device of the user, wherein the data comprises information for processing the purchase order with a service provider; and
displaying the purchase order on a merchant device using the identifier.

2. The system of claim 1, wherein the device and the first wireless beacon connect using one of near field communication, radio communication, infrared communication, Bluetooth communication, Bluetooth Low Energy (BLE) communication, or LTE Direct communication.

3. The system of claim 1, wherein the device comprises a dashboard console device in the vehicle.

4. The system of claim 1, wherein the first wireless beacon is range limited to connect to the device within an area associated with first merchant station.

5. The system of claim 4, wherein the first wireless beacon comprises a directional antenna or physical construction configured to define the area to connect to the device.

6. The system of claim 4, wherein the first merchant station comprises one of an ordering window or an ordering intercom, and wherein the area comprises a length of an average vehicle utilizing the merchant location.

7. The system of claim 1, wherein the operations further comprise:
communicating a transaction history to the merchant, wherein the transaction history comprises information for a payment to the merchant, and wherein the merchant provides at least one item to the user based on the purchase order.

8. The system of claim 1, wherein the operations further comprise:

receiving an image of the vehicle when the device connects to the first wireless beacon; and presenting the image to the merchant with the purchase order.

9. A method comprising:

accessing check-in information for a user based on a connection between a device for the user and a first wireless beacon at a first drive through station at a merchant location for a merchant, wherein the user is located in a first vehicle at the first drive through station;

assigning, using the check-in information, an identifier to the device of the user based on a purchase order submitted at the first drive through station;

associating, using one or more hardware processors, the purchase order with the identifier;

directing, using a display device at the first drive through station, the user to a lane for the first vehicle at the merchant location based on the purchase order;

in response to determining that the first vehicle is located at a second drive through station along the lane when the device connects to a second wireless beacon at the second drive through station through short range wireless communications, communicating, using the second wireless beacon at the second drive through station, data for the purchase order to the device of the user, wherein the data comprises information for electronic transaction processing of the purchase order with a service provider using a transaction processing application of the device at the second drive through station; and displaying the purchase order on a merchant device using the identifier.

10. The method of claim 9 further comprising:

receiving an electronic payment token to the merchant for the purchase order.

11. The method of claim 10, wherein the merchant provides one or more items in the purchase order to the user after the electronic payment token is processed.

12. The method of claim 10, wherein the electronic payment token is associated with a payment instrument of the user.

13. The method of claim 10, wherein the electronic payment token is processed associated with a payment account with a payment provider for the user.

14. The method of claim 10, wherein the purchase order is submitted prior to the user arriving at the merchant location.

15. The method of claim 14, wherein the electronic payment token is processed by the device using the data.

16. The method of claim 14, wherein the purchase order is displayed to the user at the first drive through station, and wherein user updates or confirms the purchase order at the first drive through station.

17. The method of claim 9 further comprising:

determining a second vehicle has arrived at the merchant location; and tracking a location of the first vehicle at the merchant location, wherein the purchase order is further associated with the location of the first vehicle.

18. A non-transitory machine readable medium comprising a plurality of machine-readable instructions executable to cause a machine to perform operations comprising:

accessing check-in information for a user when a device of the user connects to a first wireless beacon at a first merchant station for a merchant, wherein the first merchant station is accessible by a vehicle for the user;

assigning, using the check-in information, an identifier to the device of the user based on a purchase order submitted by the user at the first merchant station;

associating the purchase order submitted by the user with the identifier;

directing, using a display device at the first merchant station, the user to a lane for the vehicle based on the purchase order;

in response to determining that the vehicle is located at a second merchant station along the lane when the device connects to a second wireless beacon at the second merchant station through short range wireless communications, communicating, to the device using the second wireless beacon at the second merchant station, transaction processing data associated with a mobile application of the device for electronic transaction processing of the purchase order at the second merchant station; and displaying the purchase order on a merchant device using the identifier.

19. The non-transitory machine readable medium of claim 18, wherein purchase order is automatically processed using an account identifier associated with the check-in information.

* * * * *